(12) United States Patent
Hammad et al.

(10) Patent No.: US 11,495,814 B2
(45) Date of Patent: Nov. 8, 2022

(54) UTILIZING BLACK POWDER FOR ELECTROLYTES FOR FLOW BATTERIES

(71) Applicant: Saudi Arabian Oil Company, Dhahran (SA)

(72) Inventors: Ahmad D. Hammad, Dhahran (SA); Bandar A. Fadhel, Dhahran (SA); Issam T. Amr, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 50 days.

(21) Appl. No.: 16/934,779

(22) Filed: Jul. 21, 2020

(65) Prior Publication Data

US 2021/0399323 A1 Dec. 23, 2021

(30) Foreign Application Priority Data

Jun. 17, 2020 (GR) .............................. 20200100343

(51) Int. Cl.
*H01M 8/18* (2006.01)
*H01M 8/1016* (2016.01)
*C01G 49/08* (2006.01)

(52) U.S. Cl.
CPC .......... *H01M 8/1016* (2013.01); *C01G 49/08* (2013.01); *H01M 8/188* (2013.01); *H01M 2300/0005* (2013.01)

(58) Field of Classification Search
CPC ............... H01M 8/1016; H01M 8/188; H01M 2300/0005; C01G 49/08
See application file for complete search history.

(56) References Cited

U.S. PATENT DOCUMENTS

| | | |
|---|---|---|
| 106,836 A | 8/1870 | Kuhlmann |
| 665,346 A | 1/1901 | Reed |
| 701,987 A | 6/1902 | Alz |
| 978,576 A | 12/1910 | Goodell |
| 2,378,905 A | 6/1945 | Bates |
| 2,614,066 A | 10/1952 | Cornell |
| 2,910,426 A | 10/1959 | Gluesenkamp |
| 3,288,692 A | 11/1966 | Leduc |
| 3,409,540 A | 11/1968 | Gould et al. |

(Continued)

FOREIGN PATENT DOCUMENTS

| | | |
|---|---|---|
| CA | 2938299 | 5/2015 |
| CN | 104923234 | 12/2017 |

(Continued)

OTHER PUBLICATIONS

Naik et al. "Carbon Dioxide sequestration in cementitious products," Report No. CNU-2009-02, REP-640, Collegef Engineering, University of Wisconsin-Milwaukee, Jan. 2009 53 pages.

(Continued)

*Primary Examiner* — Alexander Usyatinsky
(74) *Attorney, Agent, or Firm* — Fish & Richardson P.C.

(57) ABSTRACT

A method and systems are provided for utilizing black powder to form an electrolyte for a flow battery. In an exemplary method the black powder is heated under an inert atmosphere to form $Fe_3O_4$. The $Fe_3O_4$ is dissolved in an acid solution to form an electrolyte solution. A ratio of iron (II) to iron (III) is adjusted by a redox process.

12 Claims, 4 Drawing Sheets

(56) References Cited

U.S. PATENT DOCUMENTS

| | | |
|---|---|---|
| 3,427,235 A | 2/1969 | Leduc |
| 3,527,834 A | 9/1970 | Kehl et al. |
| 3,533,938 A | 10/1970 | Arnold |
| 3,585,217 A | 6/1971 | Titzenthaler |
| 3,632,497 A | 1/1972 | Leduc |
| 3,702,292 A | 11/1972 | Burich |
| 3,726,789 A | 4/1973 | Kovach |
| 3,755,143 A | 8/1973 | Hosoi et al. |
| 3,856,659 A | 12/1974 | Owen |
| 3,894,059 A | 7/1975 | Selvaratnam |
| 4,064,062 A | 12/1977 | Yurko |
| 4,090,949 A | 5/1978 | Owen et al. |
| 4,119,507 A | 10/1978 | Simmrock et al. |
| 4,134,824 A | 1/1979 | Kamm et al. |
| 4,230,551 A | 10/1980 | Salyer et al. |
| 4,264,435 A | 4/1981 | Read et al. |
| 4,297,203 A | 10/1981 | Ford et al. |
| 4,310,501 A | 1/1982 | Reh et al. |
| 4,332,663 A | 6/1982 | Bemeke |
| 4,426,276 A | 1/1984 | Dean et al. |
| 4,434,031 A | 2/1984 | Horowitz et al. |
| 4,522,802 A | 6/1985 | Setzer et al. |
| 4,527,003 A | 7/1985 | Okamoto et al. |
| 4,560,451 A | 12/1985 | Nielsen |
| 4,587,011 A | 5/1986 | Okamoto et al. |
| 4,602,986 A | 7/1986 | Ellis et al. |
| 4,655,904 A | 4/1987 | Okamoto et al. |
| 4,725,349 A | 2/1988 | Okamoto et al. |
| 4,735,728 A | 4/1988 | Wemhoff |
| 4,761,394 A | 8/1988 | Lauritzen |
| 4,786,400 A | 11/1988 | Farnsworth |
| 4,830,728 A | 5/1989 | Herbat et al. |
| 4,992,160 A | 2/1991 | Long et al. |
| 5,012,360 A | 4/1991 | Yamauchi et al. |
| 5,091,351 A | 2/1992 | Murakawa et al. |
| 5,108,581 A | 4/1992 | Aldridge |
| 5,527,436 A | 6/1996 | Cooker et al. |
| 5,601,937 A | 2/1997 | Isenberg |
| 5,624,493 A | 4/1997 | Wagh et al. |
| 5,904,837 A | 5/1999 | Fujiyama |
| 5,906,728 A | 5/1999 | Iaccino et al. |
| 5,951,850 A | 9/1999 | Ino et al. |
| 6,033,555 A | 3/2000 | Chen et al. |
| 6,190,533 B1 | 2/2001 | Bradow et al. |
| 6,210,562 B1 | 4/2001 | Xie et al. |
| 6,280,593 B1 | 8/2001 | Wiese et al. |
| 6,293,979 B1 | 9/2001 | Choudhary et al. |
| 6,312,658 B1 | 11/2001 | Hufton et al. |
| 6,319,864 B1 | 11/2001 | Hannigan et al. |
| 6,336,791 B1 | 1/2002 | O'Toole |
| 6,531,515 B2 | 3/2003 | Moore, Jr. et al. |
| 6,656,346 B2 | 12/2003 | Ino et al. |
| 6,743,961 B2 | 6/2004 | Powers |
| 6,849,356 B2 | 2/2005 | Dow et al. |
| 6,979,757 B2 | 12/2005 | Powers |
| 7,019,187 B2 | 3/2006 | Powers |
| 7,045,554 B2 | 5/2006 | Raje et al. |
| 7,132,042 B2 | 11/2006 | Genetti et al. |
| 7,302,795 B2 | 12/2007 | Vetrovec |
| 7,374,664 B2 | 5/2008 | Powers |
| 7,378,561 B2 | 5/2008 | Olah et al. |
| 7,396,449 B2 | 7/2008 | Powers |
| 7,404,889 B1 | 7/2008 | Powers |
| 7,419,584 B2 | 9/2008 | Stell et al. |
| 7,460,333 B2 | 12/2008 | Akamatsu et al. |
| 7,550,642 B2 | 6/2009 | Powers |
| 7,592,290 B2 | 9/2009 | Hussain et al. |
| 7,642,292 B2 | 1/2010 | Severinsky |
| 7,744,747 B2 | 6/2010 | Halsey |
| 7,858,834 B2 | 12/2010 | Powers |
| 7,906,559 B2 | 3/2011 | Ohlah et al. |
| 7,972,498 B2 | 7/2011 | Buchanan et al. |
| 7,973,087 B2 | 7/2011 | Kibby et al. |
| 8,152,973 B2 | 4/2012 | Yamamoto et al. |
| 8,198,338 B2 | 6/2012 | Shulenberger et al. |
| 8,287,716 B2 | 10/2012 | Al-Sadah |
| 8,303,917 B2 | 11/2012 | Miyashiro et al. |
| 8,304,567 B2 | 11/2012 | Kadota et al. |
| 8,628,668 B2 | 1/2014 | Simonson |
| 8,816,137 B2 | 8/2014 | Ohlah et al. |
| 8,845,940 B2 | 9/2014 | Niven et al. |
| 8,951,333 B2 | 2/2015 | Cabourdin et al. |
| 9,085,497 B2 | 7/2015 | Jennings |
| 9,090,543 B2 | 7/2015 | Schoedel et al. |
| 9,096,806 B2 | 8/2015 | Abba et al. |
| 9,175,409 B2 | 11/2015 | Sivasankar et al. |
| 9,221,027 B2 | 12/2015 | Kuppler et al. |
| 9,242,230 B2 | 1/2016 | Moon et al. |
| 9,255,230 B2 | 2/2016 | Shafi et al. |
| 9,260,366 B2 | 2/2016 | Verhaak et al. |
| 9,279,088 B2 | 3/2016 | Shafi et al. |
| 9,284,497 B2 | 3/2016 | Bourane et al. |
| 9,284,502 B2 | 3/2016 | Bourane et al. |
| 9,296,961 B2 | 3/2016 | Shafi et al. |
| 9,303,323 B2 | 4/2016 | DiMascio et al. |
| 9,312,454 B2 | 4/2016 | Itoh et al. |
| 9,328,035 B1 | 5/2016 | Kuhn et al. |
| 9,435,404 B2 | 9/2016 | Goleski et al. |
| 9,555,367 B2 | 1/2017 | Masel et al. |
| 9,559,375 B2 * | 1/2017 | Savinell ............... H01M 10/38 |
| 9,618,264 B1 | 4/2017 | Berdut-Teruel |
| 9,634,343 B2 | 4/2017 | Munier et al. |
| 9,675,979 B2 | 6/2017 | Hassell |
| 9,752,080 B2 | 9/2017 | Christensen et al. |
| 9,884,313 B2 | 2/2018 | Shen et al. |
| 9,963,392 B2 | 5/2018 | Deo et al. |
| 9,970,804 B2 | 5/2018 | Khousa et al. |
| 9,973,141 B2 | 5/2018 | Hammad et al. |
| 10,179,733 B2 | 1/2019 | Becker et al. |
| 10,252,243 B2 | 4/2019 | Fadhel et al. |
| 10,252,909 B2 | 4/2019 | Lofberg et al. |
| 10,329,676 B2 | 6/2019 | Kaczur et al. |
| 10,357,759 B2 | 7/2019 | D'Souza et al. |
| 10,422,754 B2 | 9/2019 | Al Hosani et al. |
| 2005/0211603 A1 | 9/2005 | Guillaume et al. |
| 2006/0171065 A1 | 8/2006 | Akamatsu et al. |
| 2008/0011644 A1 | 1/2008 | Dean |
| 2008/0011645 A1 | 1/2008 | Dean |
| 2008/0083648 A1 | 4/2008 | Bishop et al. |
| 2008/0194900 A1 | 8/2008 | Bhirud |
| 2008/0277314 A1 | 11/2008 | Halsey |
| 2008/0283445 A1 | 11/2008 | Powers |
| 2009/0050523 A1 | 2/2009 | Halsey |
| 2010/0089795 A1 | 4/2010 | Fujiyama et al. |
| 2010/0137458 A1 | 6/2010 | Erling |
| 2010/0261070 A1 * | 10/2010 | Keshavarz ............ H01M 8/188 429/345 |
| 2011/0083996 A1 | 4/2011 | Shafi et al. |
| 2011/0132770 A1 | 6/2011 | Sala et al. |
| 2011/0247500 A1 | 10/2011 | Akhras et al. |
| 2012/0077068 A1 * | 3/2012 | Wang ..................... H01M 8/20 429/107 |
| 2012/0156497 A1 * | 6/2012 | Boiko ................... C01G 49/08 977/773 |
| 2013/0062286 A1 * | 3/2013 | Ruiz Hitzky ........... H01F 1/445 252/62.51 R |
| 2013/0129610 A1 | 5/2013 | Kale |
| 2013/0220884 A1 | 8/2013 | Bourane et al. |
| 2013/0233766 A1 | 9/2013 | Shafi et al. |
| 2013/0248419 A1 | 9/2013 | Abba |
| 2015/0048777 A1 | 2/2015 | Goldstein |
| 2015/0225295 A1 | 8/2015 | Mcandlish et al. |
| 2015/0337445 A1 | 11/2015 | Hasegawa et al. |
| 2015/0343416 A1 * | 12/2015 | Fadhel .................. B01J 8/0055 252/186.1 |
| 2016/0002035 A1 | 1/2016 | Ralston et al. |
| 2016/0264886 A1 | 9/2016 | Davydov |
| 2016/0333487 A1 | 11/2016 | Rodriguez |
| 2017/0050845 A1 | 2/2017 | Lofberg et al. |
| 2017/0292197 A1 | 10/2017 | Lei et al. |
| 2017/0320751 A1 * | 11/2017 | Amiran ................. C01G 49/08 |
| 2019/0011372 A1 | 1/2019 | Cunningham et al. |
| 2019/0194074 A1 | 6/2019 | Amr et al. |

(56) References Cited

U.S. PATENT DOCUMENTS

FOREIGN PATENT DOCUMENTS

| WO | WO 2000009633 | 2/2000 |
|---|---|---|
| WO | WO 2009073436 | 6/2009 |
| WO | WO 2010009077 | 1/2010 |
| WO | WO 2010009082 | 1/2010 |
| WO | WO 2010009089 | 1/2010 |
| WO | WO 2010143783 | 12/2010 |
| WO | WO 2015128045 | 9/2013 |
| WO | WO 2014160168 | 10/2014 |
| WO | WO 2015183200 | 12/2015 |
| WO | WO 2016207892 | 12/2016 |
| WO | WO 2019112555 | 6/2019 |

OTHER PUBLICATIONS

Albrecht et al., "Unexpectedly efficient CO2 hydrogenation to higher hydrocarbons over non-doped Fe2O3," Appl, Catal., B, May 2017, 204: 119-126.
Bhuiyan, "Metathesis of Butene to Produce Propylene over Mesoporous Tungsten Oxide Catalyst: Synthesis, Characterization and Kinetic Modeling," Master thesis, King Fahd University of Petroleum and Minerals, Jun. 2013, 188 pages.
Chew et al., "Effect of nitrogen doping on the reducibility, activity and selectivity of carbon nanotube-supported iron catalysts applied in CO2 hydrogenation," Appl. Catal., A, Jul. 2014, 482: 163-170.
Choi et al., "Carbon dioxide Fischer-Tropsch synthesis: A new path to carbon-neutral fuels," Appl, Catal., B, Mar. 2017, 202: 605-610.
Choi et al., "Hydrogenation of carbon dioxide over alumina supported Fe-K catalysts," Catalysis Letters, Mar. 1996, 40: 115-118.
Crammer et al., "The Mechanism of Isomerization of Olefins with transition metal catalysts," Journal of the American Chemical Society, Mar. 1966, 88(15): 3534-3544.
Ding et al., "CO2 Hydrogenation to Hydrocarbons over Iron-Based Catalyst: Effects of Physico-Chemical Properties of Al2O3 Supports," Ind. Eng. Chem. Res., 2014, 53(45): 17563-17569.
Gräfe et al., "Bauxite residue issues: IV. Old obstacles and new pathways for in situ residue bioremediation," Hydrometallurgy, 2011, 108: 46-59.
Hu et al., "Hydrothermally stable MOFs for CO2 hydrogenation over iron-based catalyst to light olefins," J. CO2 Util., 2016, 15, 89-95.
Hua et al., "Transformation of 2-Butene into Propene on WO3/MCM-48: Metathesis and Isomerization of n-Butene," Catalysts, 2018, 8, 11 pages.
Lee et al., "Selective Positional Isomerization of 2-Butene over Alumina and La-promoted Alumina Catalysts," J. Ind. Eng. Chem., Dec. 2007, 13(7): 1062-1066.
Liu et al."Fe-MOF-derived highly active catalysts for carbon dioxide hydrogenation to valuable hydrocarbons," J. CO2 Util., Oct. 2017, 21:100-107.
Liu et al., "Pyrolyzing ZIF-8 to N-doped porous carbon facilitated by iron and potassium for CO2 hydrogenation to value-added hydrocarbons," J. CO2 Util., May 2018, 25: 120-127.
Madadkhani, "Red mud as an Ironbased Catalyst for Catalytic Cracking of Naphthalene," Master's thesis, The University of British Columbia, 2014; Shiva Makadani, The University of British Columbia, Dec. 2016, 192 pages.
Morrison, "Cis-trans Isomerization of Olefins by Intramolecular Energy Transfer," Journal of the American Chemical Society, Feb. 1965, 87(4): 932.
Nam et al., "Catalytic conversion of carbon dioxide into hydrocarbons over iron supported on alkali ion-exchanged Y-zeolite catalysts," Appl. Catal., A, Apr. 1999, 179(1-2): 155-163.
Nam et al., "Catalytic Conversion of Carbon dioxide into hyrdrocarbons over zinc promoted iron catalysts," Energy onvers. Manage., 1997, 38: S397-S402.

Ndlela et al., "Reducibility of Potassium-Promoted Iron Oxide under Hydrogen Conditions," Ind. Eng. Chem. Res., 2003, 42: 2112-2121.
Numpilai et al., "Pore size effects on physicochemical properties of Fe-Co/K-Al2O3 catalysts and their catalytic activity in CO2 hydrogenation to light olefins," Appl. Surf. Sci., Jul. 2019, 483, 581-592.
Pavlov et al., "Processes of Synthesis of 1-Butene from 2-Butene by the Positional Isomerization on Suffocation Exchangers," Russian Journal of Applied Chemistry, Jul. 2009, 82(6): 1117-1122.
Ramirez et al., "Metal Organic Framework-Derived Iron Catalysts for the Direct Hydrogenation of CO2 to Short Chain Olefins," ACS Catal., 2018, 8:9174-9182.
Russkikh et al., "Red mud as an efficient catalyst in turning CO2 hydrogenation," Chemical Science Seminar, Oct. 13, 2019; KAUST, 2019, 1 page, Abstract only.
Thach et al., "Further Improvements in Isomerization of Olefins in Solvent-free conditions," Journal of Synthetic Communications, Nov. 1992, pp. 1379-1384, Abstract only.
Visconti et al., "CO2 Hydrogentation to Lower Olefins on a High Surface Area K-Promoted Bulk FE-Catalyst," Appl. Catal., B 2017, 200, 530-542, 44 pages.
Wahyudi et al., "Utilization of Modified Red Mud as a Heterogeneous Base Catalyst for A26Transesterification of Canola Oil," Journal of Chemical Engineering of Japan, 2017, 50(7): 561-567.
Wang et al., "Fe-Cu Bimetallic Catalysts for Selective CO2 Hydrogenation to Olefin-rich C2+ Hydrocarbons," Ind. Eng. Chem. Res., Feb. 2018, 57(13): 4535-4542.
Wei et al., "New insights into the effect of sodium on Fe3O4-based nanocatalysts for CO2 hydrogenation to light olefins," Catal. Sci. Technol., 2016, 6(13): 4786-4793.
You et al., "Hydrogenation of carbon dioxide to light olefins over non-supported iron catalyst," Chin. J. Catal., May 2013, 34(5): 956-963.
"Hydrogen and Oxygen production via electrolysis powered by renewable energies to reduc environmental footprint of a WWTP,," Greenlysis, www.life-greenlysis.eu 2010-2012, 16 pages.
Du et al., "Sodium Hydroxide Production from Seawater Desalination Brine: Process Design and Energy Efficency," Environ.Sci. Technol. 52, 5949-5958, 2018, 10 pages.
Dinesh et al., "Iron-based flow batteries to store renewable energies," Environmental Chemistry Letters, Feb. 2018, 12 pages.
Yensen et al., "Open source all-iron battery for renewable energy storage," HardwareX 6 (2019) e00072, 2019, 11 pages.
Cowie et al., "Naturally occurring radioactive material and naturally occurring mercury assessment of black powder in sales gas pipelines," Radiation Protection and Environment, vol. 42, Issue 1 & 2, Jan.-Mar. & Apr.-Jun. 2019, 6 pages.
Godoy et al., "210Pb content in natural gas pipeline residues ("black-powder") and its correlation with the chemical composition," Journal of Environmental Radioactivity 83 (2005) 101e111, 12 pages.
pall.com (online), "Cyclo-Filter System," retrieved from URL <https://www.pall.com/en/oil-gas/midstream/midstream-black-powder.html>, retrieved on Jun. 16, 2020, available on or before 2020, 4 pages.
shop.pall.com (online), "Black Powder Filter," retrieved from URL <https://shop.pall.com/us/en/search?SearchTerm=black+powder+filter&resetsearch=true>, retrieved on Jun. 16, 2020, available on or before 2020, 7 pages.
Van Beurden, "On the Catalytic Aspects of Stream-Methane Reforming: A Literature Survey," ECN-I—04-003, retrieved from URL <https://publicaties.ecn.nl/PdfFetch.aspx?nr=ECN-I—04-003>, Dec. 2004, 27 pages.
PCT International Search Report and Written Opinion in International Appln. No. PCT/US2021/036600, dated Sep. 24, 2021, 14 pages.

* cited by examiner

UTILIZING BLACK POWDER FOR ELECTROLYTES FOR FLOW BATTERIES

TECHNICAL FIELD

This disclosure relates to producing electrolytes for flow batteries.

BACKGROUND

Energy storage is currently one of the major challenges in the deployment of renewable energy resources and the improvement of the electrical grid efficiency. Flow batteries are among the most promising storage options and have the potential to be cheaper and more flexible than other competitors. A flow battery is an energy storage technology that stores electrical energy as chemical energy in flowing solutions. converts and and release it in a controlled manner when required. It is worth noting that the design of a flow battery allows for the separation between power and energy capacity that keeps the cost low for large scale application and also, facilitates matching with various loads/applications.

SUMMARY

An embodiment described herein provides a method for forming electrolyte solutions for a flow battery from black powder. The method includes heating the black powder under an inert atmosphere to form $Fe_3O_4$, dissolving the $Fe_3O_4$ in an acid solution to form an electrolyte solution, and adjusting a ratio of iron (II) to iron (III) by a redox process.

Another embodiment described herein provides an electrolyte for a flow battery, including a solution of iron ions formed from black powder that has been heat-treated to be converted to $Fe_3O_4$, and dissolved in an acidic solution.

Another embodiment described herein provides a flow battery including a catholyte including iron ions formed from black powder that has been heat-treated to be converted to $Fe_3O_4$ and then dissolved in an acidic solution.

DETAILED DESCRIPTION

The electrolyte represents about 30% to about 40% of the total cost of a flow battery. As electrolytes have generally been very costly, this has limited the wide spread deployment of flow batteries. Accordingly, lower cost electrolyte materials would allow for greater adoption of flow cells. Cost reduction can be achieved by utilizing low value materials as the main raw materials for electrolyte synthesis. Waste materials, such as black powder from pipelines, are present in large quantities and are underutilized.

The techniques described herein provide for the formation of iron-containing electrolytes for flow batteries using black powder has the primary raw material. As the black powder is an abundant waste material, the costs of the electrolyte are substantially reduced.

As used herein, black powder is a solid contaminant often found in hydrocarbon pipelines. The material may be wet, for example, having a tar-like appearance. The black powder be a very fine, dry powder. Black powder can include mill scale, such as magnetite or $Fe_3O_4$, which originates from the pipe manufacturing process as steel is oxidized at high temperatures. These types of solids strongly adhere to pipe walls and are not easily removed. Further, black powder can include flash rust, such as $Fe_2O_3$ and FeOOH, from water exposure during hydrotesting. Black powder can also be formed by internal pipeline corrosion, such as caused by microbial action, acid gas corrosion, or both. Black powder can also be a carryover from gas gathering systems.

Black powder is regarded as a chronic nuisance waste that is removed from valuable process streams by the use of filter bags, separators, or cyclones, among others. Limited efforts have been exerted to utilize black powder, despite its availability in large amounts at almost no cost.

In some embodiments described herein, the black powder is tested for contamination by naturally occurring radioactive materials (NORM). NORM may include decay products formed from uranium and thorium in subsurface deposits. For example, lead-210 may be present in some black powders. However, as the materials generally decay quickly and lead-210 is a long-lived isotope, most black powder deposits are relatively free of NORM. This allows the use of black powder for other applications. However, if the black powder includes lead-210, or other norm, the black powder may be discarded.

Accordingly, the black powder can be used as the main raw material to synthesize iron based electrolyte solutions. The electrolyte solutions may be used in Fe/V, Fe/Fe and/or Fe/V mixed chloride and sulfide flow batteries, as well as in electrolytes used in fixed installation (non-flow type) batteries.

Figure 1A:
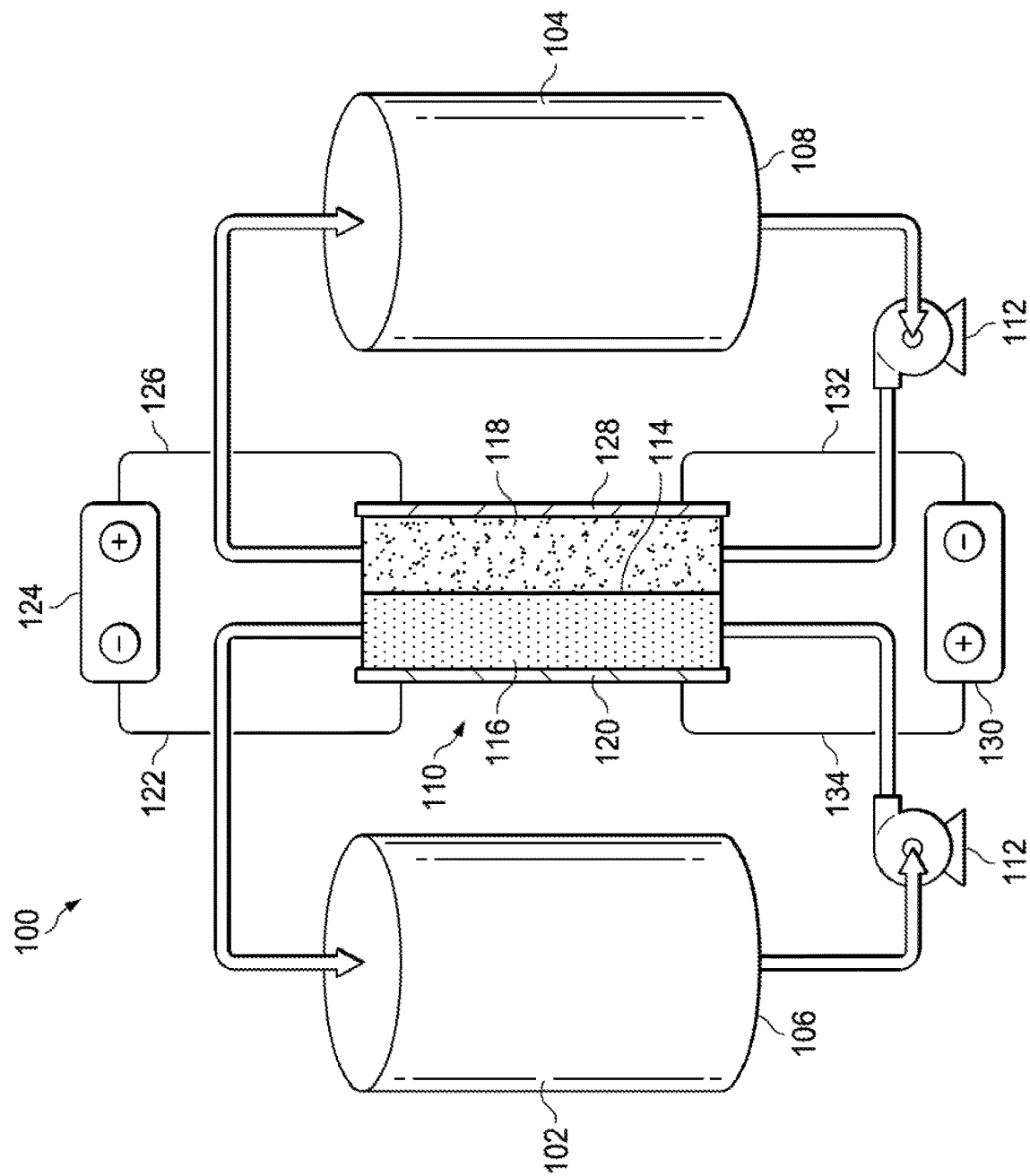
FIG. 1A is a drawing of a flow battery using two electrolytes.

FIG. 1A is a drawing of a flow battery 100 using two electrolytes. In the flow battery 100, the energy is stored in electrolytes 102 and 104, which are termed anolyte 102 and catholyte 104, herein. The electrolytes 102 and 104 are stored in tanks 106 and 108 and are separately pumped from the tanks 106 and 108 to an electrochemical cell 110 by dedicated pumps 112.

In some embodiments, an ion exchange membrane 114 is used in the electrochemical cell 110. The ion exchange membrane 114 separates the electrolytes 102 and 104 to prevent energy loss by short-circuiting, while allowing protons, or other ions, to pass between the sides during charge and discharge cycles. In some embodiments, the ion exchange membrane 114 is a sulfonated tetrafluoroethylene, commercially available as NAFION® from DuPont Chemical of Wilmington Va. The ion exchange membrane 114 generally controls the efficiency of the flow battery 100, and is a significant contributor to the cost of the flow battery 100. Accordingly, in some embodiments, the ion exchange membrane 114 is omitted and the electrolytes 102 and 104 are generally kept from mixing by laminar flow or is made unnecessary by battery design, such as if a single electrolyte solution is used.

As the electrolytes 102 and 104 are pumped through the electrochemical cell 110, they pass through channels 116 and 118. The channels 116 and 118 may include a porous electrode material, such as felt, or Rainey nickel, among others, to allow ions and electrons to flow between the electrolytes 102 and 104. In some embodiments, for example, when the ion exchange membrane 114 is omitted, the channels 116 and 118 may be narrow to enhance laminar flow.

During the production of power, the anolyte 102 is oxidized, losing electrons to the anode current collector 120. The electrons are transferred by a line 122 to a load 124. After powering the load 124, the electrons are returned to the electrochemical cell 110 by another line 126. The electrons reenter the electrochemical cell 110 from the cathode current collector 128, reducing the catholyte 104.

The anolyte 102 and catholyte 104 are regenerated during a charging cycle when a power source 130 removes electrons from the cathode current collector 128 through a line 132, oxidizing the catholyte 104 to its initial state. The electrons are provided to the anode current collector 120 from the power source 130 through another line 134, reducing the anolyte 102 to its initial state.

One of the most established technologies for flow batteries is based on vanadium redox chemistry and is termed the vanadium redox flow battery (VRB). In VRBs, vanadium ions are dissolved in an aqueous acid supporting electrolyte. VRBs are often based on $V^{2+}/V^{3+}$ and $V^{4+}/V^{5+}$ redox couples. However, VRBs have high costs for the vanadium-based electrolytes and for the Nafion membranes, providing incentives for lower cost materials.

Accordingly, a flow battery based on Fe/V redox chemistry has been explored as a potential option for lowering costs for large scale energy storage, as iron is lower cost than vanadium. In an Fe/V flow battery, during the discharge cycle of the flow battery, the catholyte 104 includes Fe(III) which is reduced to Fe(II) at the cathode current collector 128 (+), while the anolyte 102 includes V(II) which is oxidized to V(III) at the anode current collector 120 (−), according to the reactions shown below:

$$Fe^{3+}+e^-\to Fe^{2+} \quad (1)$$

$$V^{2+}\to V^{3+}+e^- \quad (2)$$

$$Fe^{3+}+V^{2+}\to V^{3+}+Fe^{2+} \quad (3)$$

Figure 1B:
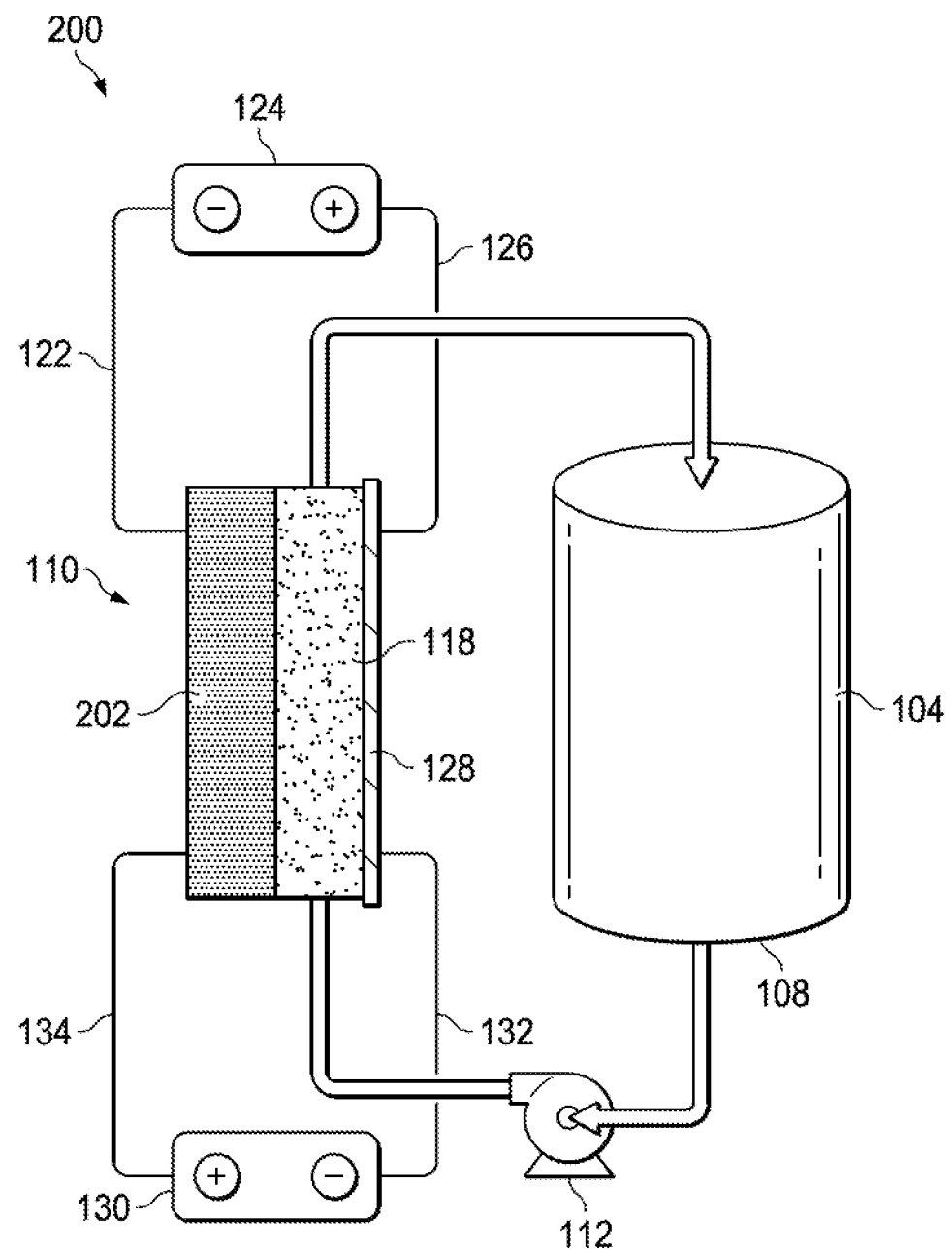
FIG. 1B is a drawing of an Fe/Fe flow battery that uses a single electrolyte solution, the catholyte, and a solid iron anode.

FIG. 1B is a drawing of an Fe/Fe flow battery 200 that uses a single electrolyte solution, the catholyte 104, and an iron anode 202. In this embodiment, during discharge, iron (III) chloride in the catholyte 104 is reduced to iron (II) chloride at the cathode current collector 128. At the iron anode 202, iron is oxidized to iron (II) chloride and dissolved into the catholyte 104. The iron anode 202 also functions as the anode current collector, eliminated the need for any additional current collectors. These processes are reversed during battery charging. During charging of the iron-chloride redox flow battery, iron (0) is deposited on the surface of the iron anode 202 by the electrochemical reduction of ferrous ions, while the catholyte 104 is regenerated to iron (III) chloride. As only one electrolyte solution is used, no ion exchange membrane 114 is used, further decreasing the cost. In some embodiments, the source of iron is black powder, either as $FeCl_2$ directly or by the electrochemical reduction of $FeCl_3$ to $FeCl_2$.

In some embodiments, the Fe/Fe flow battery does not use an iron anode 202, but uses two electrolyte solutions, an anolyte that includes $FeCl_2$ and a catholyte that includes $FeCl_3$ and $FeCl_2$. In these embodiments, an ion exchange membrane 114 is used in the configuration shown in FIG. 1A.

Examples

Figure 2:
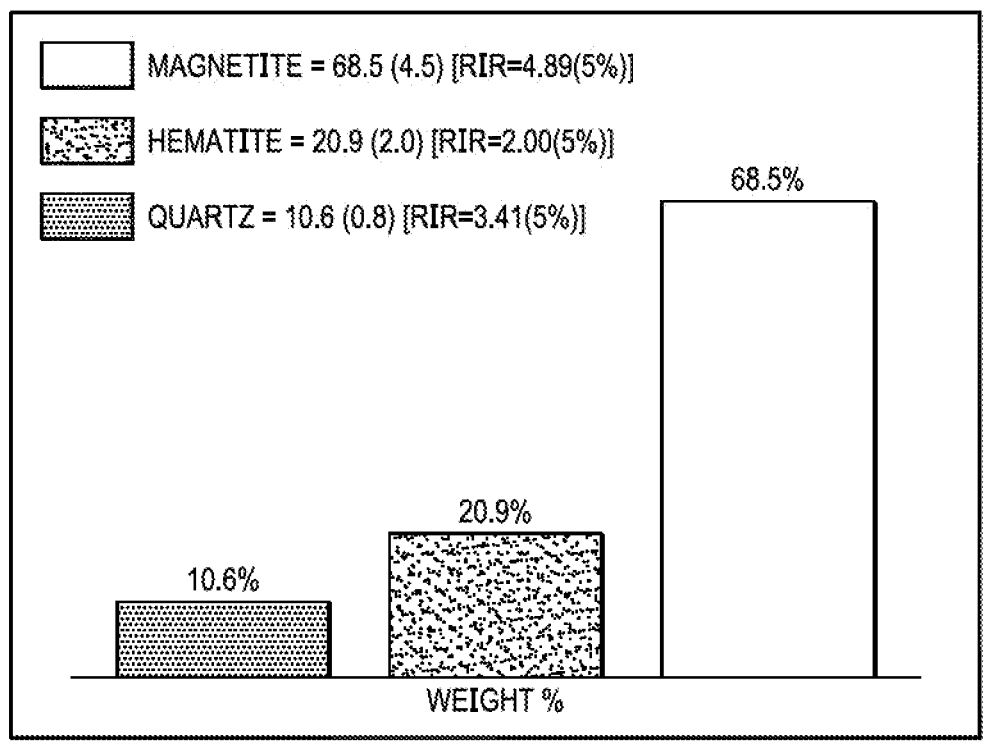
FIG. 2 is bar chart that shows the typical major mineral composition a black powder without treatment.

FIG. 2 is a bar chart that shows the typical major mineral composition of black powder without treatment. In many cases, black powder is regenerative debris that is formed inside natural gas pipelines as a result of corrosion of the internal walls of the pipeline. It can also be collected from upstream filters or filter bags used in gas refineries. The primary component in the sample is magnetite ($Fe_3O_4$) at about 68.5%. The sample also includes iron oxide or hematite ($Fe_2O_3$), at about 20.9%, as well as quartz ($SiO_2$), at about 10.6%. In other examples, the materials including, for example, metal carbonates, metal hydroxides, and sulfide iron carbonates may be present.

Preparation of Black Powder for Use in an Electrolyte

Figure 3:
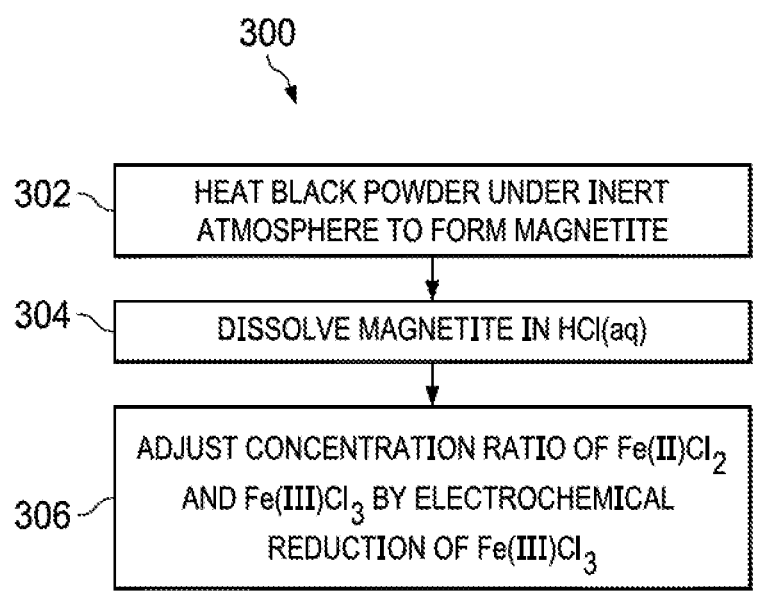
FIG. 3 is a process flow diagram of a method converting black powder to an iron electrolyte for use in a flow battery.

FIG. 3 is a process flow diagram of a method 300 for converting black powder to an iron electrolyte for use in a flow battery. As described in embodiments herein, black powder is used as the iron source for iron based flow-batteries. This may be achieved by converting the iron in the black powder to iron (II) chloride or iron (III) chloride, for example, by the techniques of the method 300. The method 300 begins at block 302.

Figure 4:
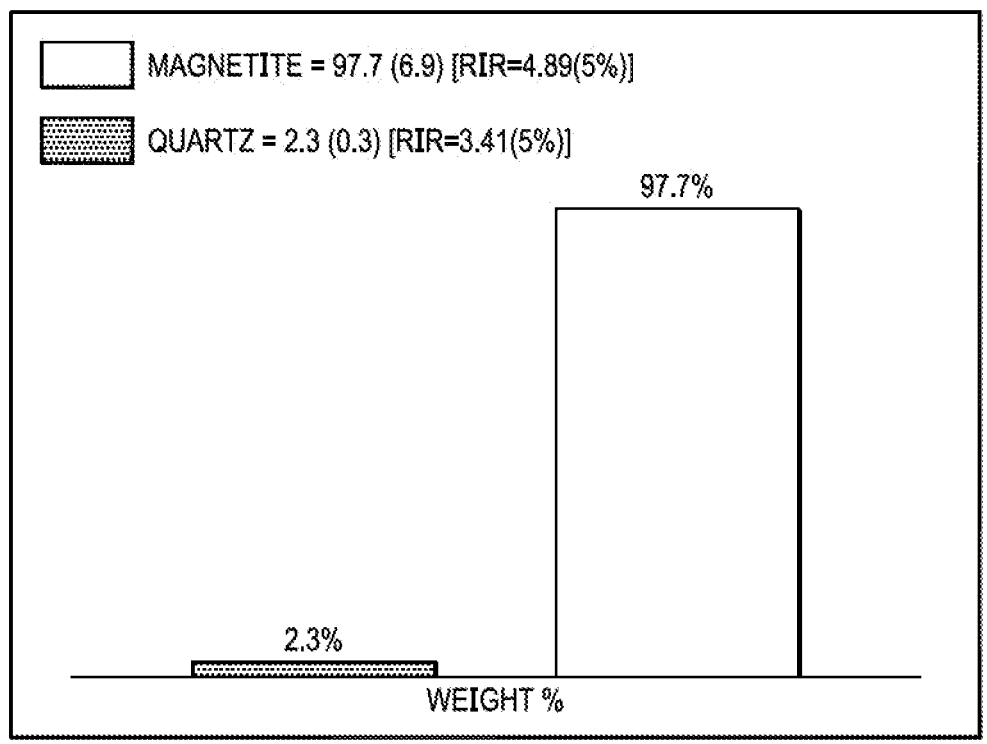
FIG. 4 is a bar chart that shows the mineral composition of black powder after treatment at 400° C. under an inert gas.

At block 302, the black powder is heated under an inert atmosphere to form magnetite ($Fe_3O_4$), as described with respect to FIG. 4. At block 304, the resulting magnetite is dissolved in HCl (aq), or an acid mixture that includes sulfides, sulfites, sulfates, nitrites, or nitrates, among others, to form iron (II) chloride and iron (III) chloride. At block 306, the concentration ratio of the iron (II) chloride to iron (III) chloride is adjusted, for example, by electrochemical reduction of iron (III) chloride.

FIG. 4 is a bar chart that shows the mineral composition of the black powder after treatment at 400° C. under an inert gas. Initially, the black powder is heat-treated at about 400° C. to about 700° C., under nitrogen, to convert the iron content to magnetite ($Fe_3O_4$). The heat treatment converts the black powder to a blend of about 97.7% magnetite ($Fe_3O_4$) and about 2.3% quartz ($SiO_2$), as depicted in Equation 4.

$$\text{Black Powder} \xrightarrow[N_2]{\Delta} Fe_3O_4 \quad (4)$$

Figure 5:
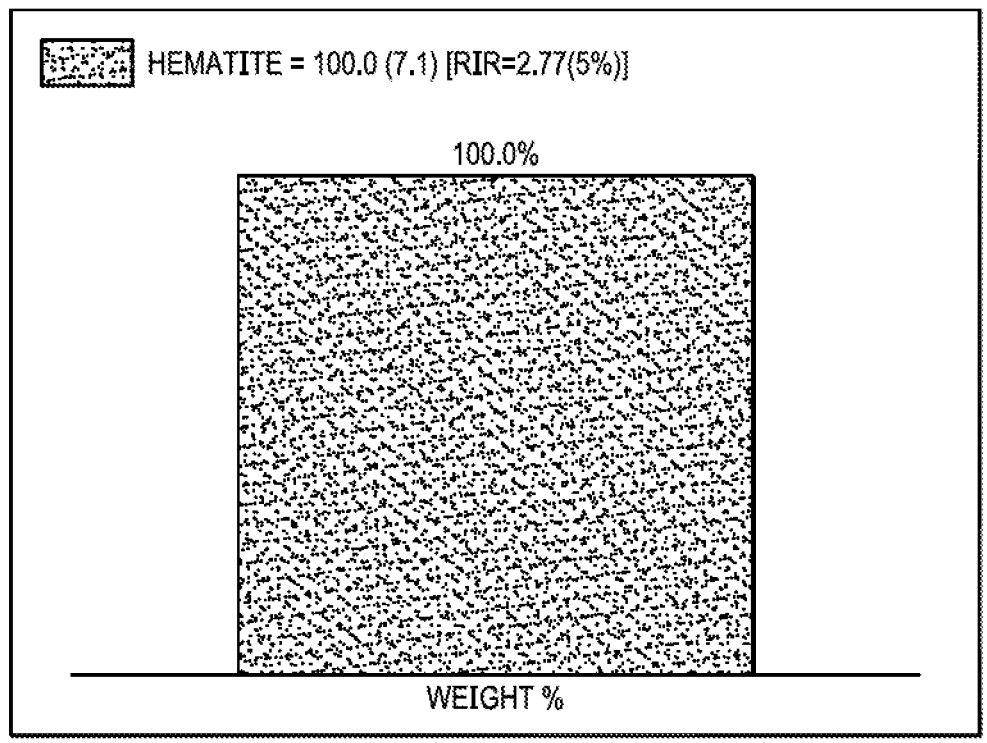
FIG. 5 is a bar chart that shows the mineral composition of black powder after treatment at 775° C. in air.

FIG. 5 is a bar chart that shows the mineral composition of black powder after treatment at 775° C. under air to form hematite or $Fe_2O_3$. As this chart indicates, the oxygen free environment provided by the inert atmosphere ($N_2$) is important in the black powder transformation, since treating the black powder under an oxygen containing environment, such as air, will result in the formation of ferric oxide, $Fe_2O_3$, which is not a good precursor for forming $FeCl_3$.

Preparation of Anolyte and Catholyte Solutions

After the heat treatment to form the magnetite ($Fe_3O_4$), the electrolytes can be prepared at room temperature using deionized (DI) water. This may be performed by preparing a solution of HCl, or a mixture of acids, at a concentration of about 1 to about 6 molar (M) in the DI water.

To prepare the electrolytes for an Fe/V flow battery from the black powder, the appropriate metal sources are dissolved in the HCl(aq) or acid solution. For the anolyte, $VCl_3$, $VOSO_4$, or both is dissolved in HCl(aq) form a solution of vanadium with a concentration of about 1 M to about 4 M. For the catholyte solution, the magnetite powder formed by heating under an inert atmosphere is dissolved in the HCl (aq) to form an iron solution of about 1 M to about 4 M iron ions. The amount of the iron (II) chloride in the solution may then be adjusted by a redox process, such as electrochemically reducing $FeCl_3$ to $FeCl_2$.

To prepare the catholyte for an Fe/Fe flow battery from the black powder, the magnetite is dissolved in the HCl(aq) or acid solution. In this embodiment, only one electrolyte is prepared, iron (II) chloride. The magnetite powder formed by heating under an inert atmosphere is dissolved in the HCl(aq) to form a solution of about 1 M to about 4 M in concentration of iron. The amount of the iron (II) chloride in the solution may then be adjusted by electrochemically reducing $FeCl_3$ to $FeCl_2$, such as during the operation of the flow battery.

An embodiment described herein provides a method for forming electrolyte solutions for a flow battery from black powder. The method includes heating the black powder under an inert atmosphere to form $Fe_3O_4$, dissolving the $Fe_3O_4$ in an acid solution to form an electrolyte solution, and adjusting a ratio of iron (II) to iron (III) by a redox process.

In an aspect, the method includes analyzing the black powder for naturally occurring radioactive materials. In an aspect, the method includes discarding black powder including naturally occurring radioactive materials.

In an aspect, the method includes heating the black powder to a temperature of between about 400° C. and about 700° C. In an aspect, the method includes heating the black powder to a temperature of about 400° C.

In an aspect, the method includes mixing the acid solution to a concentration of about 1 molar to about 6 molar. In an aspect, the method includes mixing an HCl solution to a concentration of about 1 molar to about 6 molar to form the acid solution. In an aspect, the method includes dissolving the $Fe_3O_4$ in an acid solution comprising an HCl solution to form the electrolyte solution of a concentration of about 1 molar to about 4 molar iron ions.

In an aspect, the method includes adjusting the ratio of iron (II) to iron (III) by reducing iron (III) to iron (II) in an electrochemical cell. In an aspect, the method includes adjusting the ratio of iron (III) to iron (II) in the flow battery during a recharging process.

In an aspect, the method includes dissolving a vanadium compound in a second acid solution to form an anolyte. In an aspect, the method includes dissolving $VCl_3$, $VOSO_4$, or both in the second acid solution solution form a solution of about 1 M to about 4 M in concentration of vanadium.

Another embodiment described herein provides an electrolyte for a flow battery, including a solution of iron ions formed from black powder that has been heat-treated to be converted to magnetite and dissolved in an acidic solution.

In an aspect, the electrolyte includes an HCl solution of about 1 molar to about 6 molar in concentration. In an aspect, the electrolyte includes a solution of iron (II) and iron (III) ions in a concentration of about 1 molar to about 4 molar in iron. In an aspect, the electrolyte includes a solution of iron (II) ions formed from iron (III) ions in an electrochemical cell.

Another embodiment described herein provides a flow battery including a catholyte including iron ions formed from black powder that has been heat-treated to be converted to $Fe_3O_4$ and then dissolved in an acidic solution.

In an aspect, the catholyte includes an acidic solution of iron (III) ions and iron (II) ions. In an aspect, the flow battery includes a solid iron anode. In an aspect, the flow battery includes an anolyte including an acidic solution of iron (II) ions.

Other implementations are also within the scope of the following claims.

What is claimed is:

1. A method for forming electrolyte solutions for a flow battery from black powder, wherein the black powder comprises $Fe_3O_4$, $Fe_2O_3$, or FeOOH, or any combination thereof, the method comprising:
heating the black powder under an inert atmosphere to form $Fe_3O_4$;
dissolving the $Fe_3O_4$ in an acid solution to form an electrolyte solution; and
adjusting a ratio of iron (II) to iron (III) by a redox process.

2. The method of claim 1, comprising analyzing the black powder for naturally occurring radioactive materials.

3. The method of claim 2, comprising discarding black powder comprising naturally occurring radioactive materials.

4. The method of claim 1, comprising heating the black powder to a temperature of between about 400° C. and about 700° C.

5. The method of claim 1, comprising heating the black powder to a temperature of about 400° C.

6. The method of claim 1, comprising mixing the acid solution to a concentration of about 1 molar to about 6 molar.

7. The method of claim 1, comprising mixing an HCl solution to a concentration of about 1 molar to about 6 molar to form the acid solution.

8. The method of claim 1, comprising dissolving the $Fe_3O_4$ in an acid solution comprising an HCl solution to form the electrolyte solution of a concentration of about 1 molar to about 4 molar iron ions.

9. The method of claim 1, comprising adjusting the ratio of iron (II) to iron (III) by reducing iron (III) to iron (II) in an electrochemical cell.

10. The method of claim 9, comprising adjusting the ratio of iron (III) to iron (II) in the flow battery during a recharging process.

11. The method of claim 1, comprising dissolving a vanadium compound in an acid to form an anolyte.

12. The method of claim 11, comprising dissolving $VCl_3$, $VOSO_4$, or both in an HCl solution form a solution of about 1 M to about 4 M in concentration of vanadium.

* * * * *